Patented Aug. 19, 1952

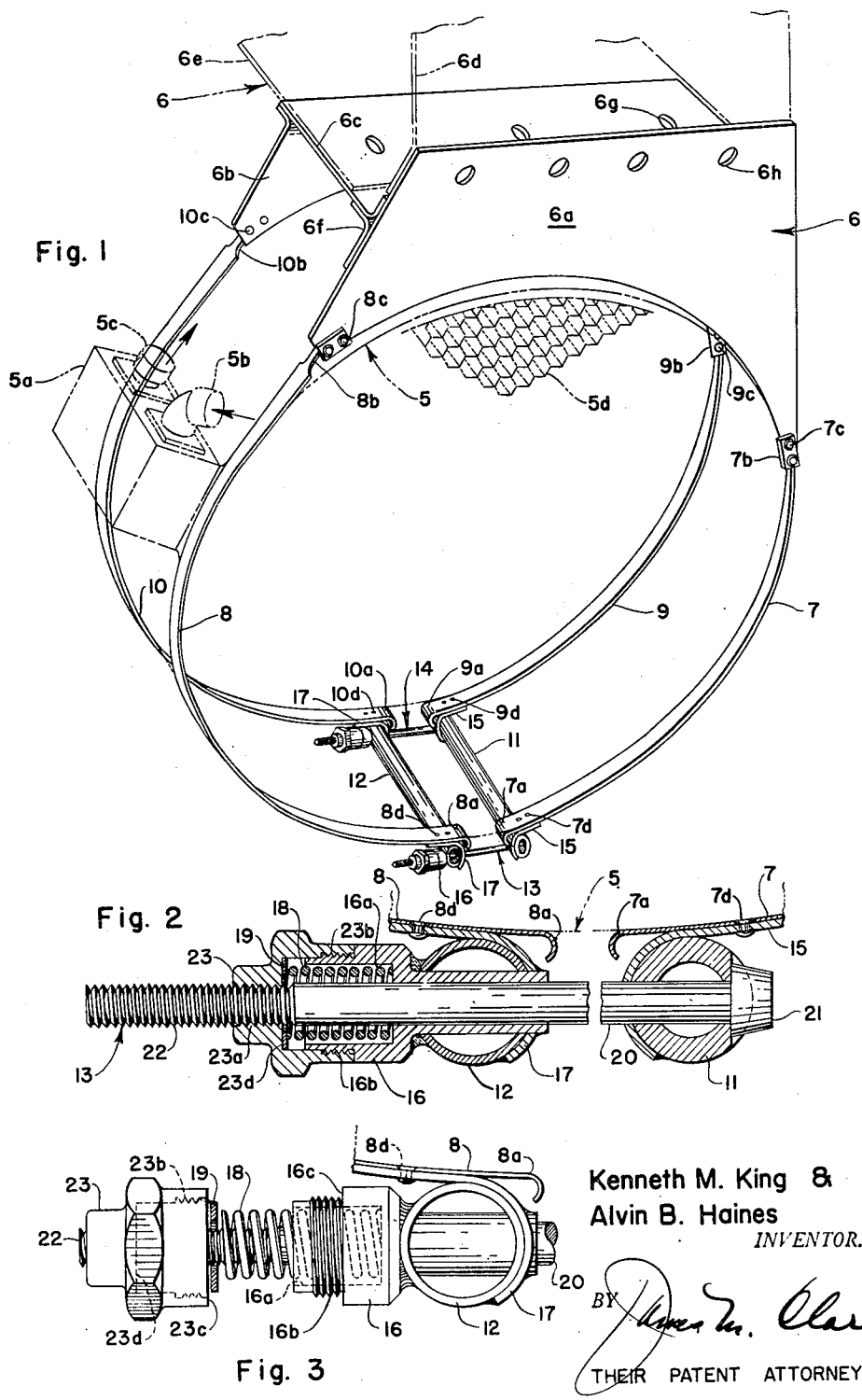

2,607,258

UNITED STATES PATENT OFFICE 2,607,258

LOAD LIMITING FASTENING MEANS

Kenneth M. King, San Diego, Calif., and Alvin B. Haines, Seattle, Wash., assignors to Boeing Airplane Company, a corporation of Delaware Application May 10, 1949, Serial No. 92,426

8 Claims. (Cl. 85—32)

1

The present invention relates generally to fastening means and supports and more particularly to improved fastening and supporting devices which are prevented from being tightened beyond certain loads or stresses.

In the use of fastening devices, particularly of the threaded type, it frequently occurs that a mechanic in tightening such a device strips the threads or otherwise damages the fastening device or the object being fastened, by the application of to great a torque to the fastening means. Numerous expedients have been devised to prevent overstressing or applying too great a torque or tightening force to such threaded fastening devices, and torque wrenches of the indicating or automatically slipping types have most frequently been utilized to prevent the unintentional application of too great forces to such devices. Inasmuch as torque wrenches are relatively more expensive than wrenches of the plain type and in many cases require the special attention of the workman in respect to their settings for different size devices, and their indication of the safe torque when applied to these devices, they have most frequently been used in assembly work where the same operator will tighten a relatively large number of fastening devices of a given size or diameter. Many fastening devices which are assembled carefully with the use of torque wrenches are subject to being disassembled for servicing or replacement in the field by any available tools and by means of which it is not always possible to retighten the fastening devices to the same desired degree or tightness. Certain types of equipment such as oil coolers, radiators and many other devices are easily damaged by supporting means which are fastened too tightly, and even when such means are not tightened sufficiently.

The present invention is directed to an improved fastening or supporting means which by the use of ordinary tools may be readily tightened to a predetermined safe loading or degree of tightness. The present device comprises essentially a threaded bolt or screw member slidably engaged by a sleeve having a threaded and shouldered portion which is in turn threadedly engaged by a cap nut which also engages the threads of the bolt shank. A spring or other resilient means of a predetermined resistance to compression is interposed between the sleeve and nut elements and automatically determines an axial loading of the bolt shank prior to the engagement of the nut with the sleeve which engagement establishes and maintains a predetermined axial loading as determined by the resistance of the resilient element.

2

It is, accordingly, a major object of the present invention to provide an improved fastening means which automatically established a predetermined stressing or loading of the fastening device upon its being closed or fully tightened. It is a further object of the present invention to provide an improved and simplified fastening device by means of which the structure being clamped or fastened is not subjected to damaging stresses beyond predetermined safe loads. It is a further object to provide a simple, foolproof threaded fastening device which may be assembled by the use of ordinary tools without the requirements of special torque wrenches or devices which indicate the applied torque or other tightening forces. It is a still further object to provide a torque limiting fastening device which can readily be disassembled and reassembled many times with precisely the same resulting tightness and without the use of special tools or other equipment. It is a further object of the present invention to provide an improved supporting arrangement or a device which is safely attached thereto by predetermined clamping forces which adequately secure and support the device while positively preventing damage thereto by over-tightening or over-stressing the fastening means. A further object resides in the provision of a positive stop sling or support for an oil cooler such as used in aircraft installations and in the particular relationship of the fastening and supporting elements of such a sling assembly.

Other objects and advantages of the present invention will occur to those skilled in the art after reading the present description taken in conjunction with the accompanying drawings, in which:

Fig. 1 is a perspective view of a form of the present invention as applied to an oil cooler support and fastening;

Fig. 2 is an enlarged sectional view of the improved fastening means used in the supporting assembly shown in Fig. 1; and Fig. 3 is a similar detailed view of the fastening means in a partially disassembled relationship.

Referring now to Fig. 1, the numeral 5 represents an oil cooler such as is commonly used in aircraft, being suspended from the aircraft structural framework generally indicated by the numeral 6. The oil cooler 5 is of substantially cylindrical or drum shape being provided with a valve assembly 5a having an oil inlet 5b and an outlet 5c. The valve housing 5a usually includes an automatic temperature regulating valve by means of which the cooling effect of the cooler and the temperature of the oil may be automatically controlled. As is well known in the oil cooler art, the body of the cooler is usually provided with numerous open ended tubes in a honeycomb arrangement as indicated at 5d through which the cooling air passes, and around which the oil flows and is cooled.

The numeral 6 represents a supporting assembly from which the oil cooler 5 may be suspended by the strap or sling assembly comprising the pairs of straps 7 and 8, and 9 and 10, having their respective terminals 7a, 8a, 9a and 10a, interconnected between the strap pairs by the tubular ties 11 and 12 and the improved load-limiting fastening means 13 and 14. The supporting assembly 6 preferably comprises a substantially vertical front plate 6a and a somewhat shallower flanged rear plate 6b interconnected by the horizontal plate 6c. The plates 6d and 6e preferably form a part of the fixed airplane structure and are attached to the plates 6a and 6c by means of bolts or rivets through the holes 6g and 6h. The axial spacing and torsional stiffness of the supporting assembly 6 is preferably improved by the angular bracket or clip element 6f which may have its legs or flanges welded or otherwise fixed to the plates 6a and 6c. The upper terminals of the respective straps 7, 8, 9 and 10 are provided with apertured terminal portions such as 7b, 8b and 10b, which are fastened as by the bolts 7c, 8c and 10c, to the plates 6a and 6b.

As shown in Fig. 2, the straps 7 and 8 are preferably of thin steel or other metallic bands having their lower terminals rounded into the nosing portions 7a and 8a. Reinforcing terminal plates 15 and 17 are respectively fastened to the straps 7 and 8, as by the countersunk rivets 7d and 8d and are also welded or otherwise attached to the above longitudinally or axially extending tubular tie elements 11 and 12. The metallic straps or bands 7, 8, 9 and 10 are of resilient material arcuately formed to follow the circular circumference of the exterior jacket of the oil cooler 5 and are each of a length such that they are spaced apart at the bottom of the cooler after they have been installed and tightened.

A sleeve member 16 has its tubular shank portion fitted within an opening through the walls of the tube 12 to which it is firmly attached, as by the welding indicated in Figs. 2 and 3. The sleeve element 16 is suitably bored to permit the shank of the bolt 20 to freely pass and slide therethrough and is also provided with an enlarged internal recessed portion 16a for housing a compression spring 18, as well as a reduced diameter threaded portion 16b terminating in a shoulder 16c provided by the main body of the sleeve. The bolt or screw shank 20 is preferably provided with an integral headed portion 21 and the opposite end of its shank is threaded as at 22. An annular washer 19 is preferably disposed against the free end of the compression spring 18 and a threaded cap nut 23 is provided with separate internal threads, one thread 23b engaging the threaded portion 16b of the sleeve 16 and the other thread 23a engaging the threaded portion 22 on the shank 20. The oil cooler 5 is installed in its suspended position between the right sling or strap assembly 7—9—11 from the left strap assembly 8—10—12 by the connection of the fastening means 13 and 14. The straps 7—9 and 8—10, are sufficiently resilient and flexible to permit spreading such that the oil cooler 5 and its attached valve and port assembly 5a may be inserted between the front and rear straps and temporarily held in position while the fastening means 13 and 14 are inserted and connected.

The operation of the improved fastening means 13, which is identical with 14, is by reference to Figs. 2 and 3, as follows: The shank 20 of the headed bolt is inserted through the opening in the tubular terminal elements 11 and 12, as well as through the bore of the sleeve 16, passing also through their attached terminal elements 15 and 17. The compression coil spring 18 is then inserted over the end of the shank of the bolt 20 with the end of the spring inserted within the recess 16a of the sleeve member 16. The washer 19 is then similarly disposed about the shank 20 to engage the free end of the spring 18 and the cap nut 23 is then threadedly engaged with the threads 22 of the shank 20.

It will be understood that in order to tighten the sling assembly about the oil cooler 5 it is necessary to place the straps 7, 9, 8 and 10 under "hoop tension," which tension is also transmitted in a like amount through the fastening assemblies 13 and 14. As the cap nut 23 is rotated upon the threads 22, from the opened position shown in Fig. 3 it approaches the position in which its internal shoulder 23d bears against the washer 19, and thereby against the spring 18. As the cap nut 23 is continued to be rotated it compresses the spring 18 to a gradually increasing degree and simultaneously tensions the shank 20, which also tensions the straps 7 and 8 to the same extent. It will be noted that in this initial compressioning stage of the spring 18 the threads 23b of the cap nut 23 have not yet engaged the threads 16b of the sleeve member 16. While the spring 18 has now been compressed to a certain extent due to the movement of the cap nut 23 along the bolt shank threads 22, there is as yet no direct engagement with the sleeve 16. The latter accordingly serves at this stage of the assembly as an intermediate spacer or equalizing element between the compressive load of the spring 18 and the tensile load within the hoops 7 and 8, which in effect is equivalent to a similar compressive load between the sleeve 16 and the head 21 of the bolt.

As indicated above, the spring 18 is designed and constructed to provide a predetermined resistance to compression for given distances or spaces into which it has been compressed. Accordingly, when the spring 18 has been compressed to the extent that the threads 23b start to engage the threads 16b, a predetermined compression has been built up in the spring which is reflected as an axial tensile load within the bolt shank 20. As the threads 23b engage the threads 16b, this load is taken up directly between the cap nut 23 and the sleeve member 16; and the spring 18 while creating a load opposing the tightening of the cap nut 23 with respect to the sleeve 16 transfers all of its compressive load into the nut and sleeve assembly whenever the threading operation is stopped. As the threading of the cap nut 23 is continued along both the threads 22 of the bolt shank 20 and the threads 16b of the sleeve 16, the compression of the spring 18 continues and the tensioning of the straps 7 and 8, as well as the shank 20 of the fastening assembly is similarly increased until the shoulder 16c and end face 23c at the ends of the threads 16b and 23b engage each other and limit the further relative rotational threading engagement between the elements 16 and 23.

When the cap nut 23 is prevented from further rotation by this engagement of the shoulders 16c and 23c, the cap nut 23 is locked by the threaded sleeve element 16 upon the threads 22, being assisted by the member 16, and being prevented from relative rotation about the axis of the shank 20. This locking condition is further assisted by the interconnection of the like sleeve element in the rear fastening assembly 14 by the longitudinal terminal tube 12. During the tightening of the nut element 23 upon the sleeve member 16 along the threads 16b—23b, the increasing frictional resistance due to the compression of the spring 18 is kept within reasonable limits by the friction-reducing washer 19 and after the nut element 23 has been locked with respect to the sleeve element 16 the spring 18 serves as an additional locking means of an elastic nature to prevent inadvertent loosening of the threads 16b—23b, and the threads 22—23a, due to vibration or from other causes and to thereby doubly lock the fastening means about the shell of the oil cooler 5. Inasmuch as the resistance of the fully compressed spring 18 can be predetermined and is measurable, and the effect of the threading along the threads 16b—23b can also be carefully predicted and established, a predetermined "hoop tension" is created within the strap elements 7 and 8 which is also represented as an axial tensile load in the shank 20. In the particular oil cooler installation which has been shown in the drawings for illustrative purposes, a predetermined tension of the improved load limiting fastening means was designed for sixty-eight (68) pounds tension. This degree of tension was found adequate to secure the oil cooler to the aircraft structure against severe vibrational forces and air loads due to the flow of cooling air through the oil cooler, and can of course be varied to suit different installations.

The pairs of front and rear straps cooperate with each other in forming an efficient oil cooler sling or support in that the lower terminals of each strap are firmly tied together and accurately spaced apart by the tubular elements 11 and 12, which also serve as anti-torque means to prevent rotation or twisting of the sleeve 16. These tubular terminal elements also assist in assemblying the supports about the oil cooler in that they can be temporarily grasped or clamped together while the elements of the positive stop means are assembled and tightened into position. In assemblying the pairs of straps 7—8, and 9—10, it is preferable that the cap nuts on the fastening means 13 and 14 be tightened progressively at about the same time in order that the tension in the front and rear straps are substantially the same, and twisting or distortion due to unbalance of these tensioning forces is thereby prevented. As the cap nuts on each of the front and rear fasteners are fully tightened, the tension within each band will be substantially identical and at the predetermined safe load without overloading the oil cooler regardless of how often the fastening means may be disassembled and reassembled about the oil cooler, or other components of dimensions for which the fastening means are intended. It thus obviates the use of torque wrenches and is far more accurate than a torque wrench inasmuch as it measures strap tension directly neglecting thread friction. While a preferred form of the present invention has been shown applied to an oil cooler, it will be understood that the improved load limiting fastening means which has been disclosed herein may be applied to other devices.

Other forms and modifications of the present invention which may occur to those skilled in the art after reading the present description, are intended to come within the scope and spirit of this invention as more particularly defined in the appended claims.

We claim:

1. In a device for limiting the tension developed within a fastening means including a headed bolt having a threaded shank portion, a sleeve element having an apertured portion arranged to be freely slid along said bolt shank portion, said sleeve element having threads radially spaced from said apertured portion, a nut element internally threaded for engagement with the threads of said bolt shank, said nut element having further threads engageable with the threads of said sleeve element, torque means cooperating with said bolt shank and said sleeve element to prevent relative rotation of said sleeve element with respect to said bolt shank, and compressible means opposing the threaded engagement of said nut element with said sleeve element as said nut element is threadedly advanced along the threads of said bolt shank, whereby the compressibility of said means automatically determines the maximum tension developed within said bolt shank as said nut element threadedly engages said sleeve element.

2. Means for predetermining the degree of axial tension developed within a fastening device including a headed bolt having a threaded shank and a nut element threadedly engaging said bolt shank for compressing an object between said nut element and said bolt head, comprising an apertured sleeve element disposed about said bolt shank and between said object and said nut element, the aperture in said sleeve element being of a size permitting sliding of said sleeve element over said threaded shank portion without engagement therewith, locking threads cooperatively carried by said sleeve and nut elements, means to prevent relative rotation of said sleeve element with respect to said bolt shank, and resilient means interposed between said nut and sleeve elements having compression characteristics arranged to develop a predetermined axial load within said bolt shank as said nut is successively advanced along said threaded shank and threadedly locked with respect to said sleeve element.

3. An automatic fastening device for developing a predetermined clamping pressure about a work assembly comprising a bolt element having a head and a threaded shank, an apertured element having a threaded portion, said apertured element arranged for sliding freely in an axial direction along said threaded bolt shank, a nut element internally threaded for engagement with said threaded bolt shank, said nut element having a second threaded portion engageable with the threaded portion of said apertured element, torque means cooperating with said bolt shank and said apertured element to prevent relative rotation of said apertured element with respect to said bolt shank, and resilient means disposed in such manner as to oppose the engagement of said nut element with said apertured elements, said means having a predetermined resilience such that it causes a predetermined clamping pressure between said bolt head and said apertured element at which pressure said resilience is overcome and said nut element is threadedly locked to said apertured element for automatically applying and maintaining said predetermined clamping pressure.

4. A fastening device for two apertured members arranged to be fastened together at a predetermined pressure, comprising a bolt having a threaded shank passing through said apertures, an apertured sleeve element arranged to be freely slid over said bolt shank against said members, said sleeve element having a threaded portion externally of its aperture, a nut element having separate threads of different diameters arranged to engage said bolt shank and said threaded sleeve element respectively, torque means cooperating with said bolt shank and said apertured sleeve element for preventing relative rotation of said sleeve element with respect to said bolt shank, and spring means disposed between said nut element and sleeve element arranged to limit the load developed within said bolt by the complete tightening of said nut element with respect to sleeve element.

5. A device for automatically limiting the clamping load developed by a fastening means comprising a headed bolt having a threaded shank portion, an apertured sleeve element arranged to be freely slid along said bolt shank portion, said sleeve element having a threaded portion remote from said aperture, said sleeve element and said bolt arranged to be engaged with work elements to be subjected to a clamping load, a nut element internally threaded for engagement with the threaded portion of said bolt shank, said nut element having further threads engageable with the threads of said sleeve element, torque means cooperating with said bolt shank and said apertured sleeve element for preventing relative rotation of said sleeve element with respect to said bolt shank, and resilient means interposed between said nut and sleeve elements opposing the threaded engagement of said nut element with said sleeve elements as said nut element is advanced along the threaded portion of said bolt shank, said sleeve element floatingly disposed upon said bolt shank for transmitting the resilient opposition of said means to the clamping of said work elements.

6. In a device for limiting the tensile load developed within a fastening means including a headed bolt having a threaded shank portion, an apertured threaded sleeve element arranged to be freely slid along said bolt shank portion, the threads of said sleeve element disposed remote from its apertured portion, compressible work pieces arranged to be disposed between said sleeve element and said bolt head, a nut element internally threaded for engagement with the threads of said bolt shank, said nut element having further threads engageable with the threads of said sleeve element, torque means cooperating with said bolt shank and said sleeve elements to permit relative axial movement while preventing relative rotation of said sleeve element with respect to said bolt shank, resilient means opposing the threaded engagement of said nut element with said sleeve element as said nut is advanced along the threads of said bolt shank, said resilient means serving to automatically establish the loading of said work pieces as determined by its resilient opposition to the advance of said nut element along said bolt shank.

7. Means for automatically predetermining the magnitude of axial tension developed within a fastening device including a headed bolt having a threaded shank and a nut element threadedly engaging said bolt shank for compressing an object between said nut element and said bolt head, comprising an apertured sleeve element floatingly disposed about said bolt shank and between said object and said nut element, locking threads cooperatively carried by said sleeve and nut elements, stop portions carried by said sleeve and nut elements for limiting their threaded engagement, torque means cooperating with said bolt shank and said apertured sleeve element to prevent relative rotation of said sleeve element with respect to said bolt shank, and resilient means interposed between said nut and sleeve elements having compression characteristics arranged to develop a predetermined axial tensile load within said bolt shank as said nut is successively advanced along said threaded shank and threadedly locked with respect to said sleeve element and said resilient means is locked out by said threaded engagement.

8. Automatic means for predetermining the degree of axial tension developed within a fastening device including a headed bolt having a threaded shank and a nut element threadedly engaging said bolt shank for compressing an object between said nut element and said bolt head, including an apertured sleeve element floatingly disposed about said bolt shank and between said object and said nut element, locking threads remote from said bolt shank threads cooperatively carried by said sleeve and nut elements, stop means cooperatively carried by said nut and said sleeve elements for limiting the amount of threaded engagement of said locking threads, torque means cooperating with said bolt shank and said sleeve element preventing relative rotation of said sleeve element with respect to said bolt shank, and resilient means interposed between said nut and sleeve elements having compression characteristics arranged to develop a predetermined compression of said object equal to the axial load within said bolt shank as said nut is successively advanced along said threaded shank and threadedly locked with respect to said sleeve element.

KENNETH M. KING.
ALVIN B. HAINES.

REFERENCES CITED

The following references are of record in the file of this patent:

UNITED STATES PATENTS

| Number | Name | Date |
| --- | --- | --- |
| 1,246,353 | Thigpen | Nov. 13, 1917 |
| 1,487,903 | Vitek | Mar. 25, 1924 |
| 1,542,647 | Moratta | June 16, 1925 |
| 2,151,255 | Witchger | Mar. 21, 1939 |